United States Statutory Invention Registration [19]

[11] Reg. Number: H281

Munach [43] Published: Jun. 2, 1987

[54] SAFING AND ARMING DEVICE

[75] Inventor: Arnold S. Munach, Rockville, Md.

[73] Assignee: The United States of America as represented by the Secretary of the Navy, Washington, D.C.

[21] Appl. No.: 922,660

[22] Filed: Oct. 24, 1986

Related U.S. Application Data

[63] Continuation-in-part of Ser. No. 216,400, Dec. 15, 1980, abandoned.

[51] Int. Cl.[4] ..... F42C 15/00

[52] U.S. Cl. ..... 102/254; 102/262

*Primary Examiner*—David H. Brown

*Attorney, Agent, or Firm*—Kenneth E. Walden; Frederick A. Wein

[57] ABSTRACT

There is disclosed a safe and arming device for ordnance fuzes including an interrupter. The interrupter includes a cylindrical body adapted for rotational or axial movement in a housing when subjected to acceleration or other mechanical force in a bomb, missile, or other projectile for which designed. The cylindrical body is provided with a plurality of radially extending orthogonal openings containing detonators, whereby, upon movement of the cylindrical body, the detonators are brought into facing explosive communication with explosive leads for arming the fuze.

4 Claims, 11 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

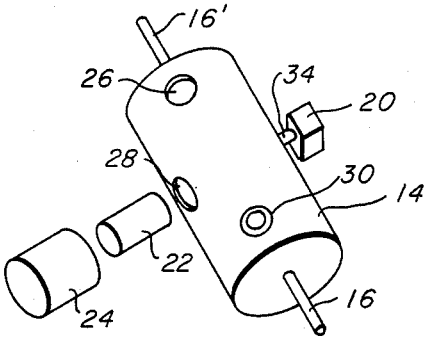
FIG. 4
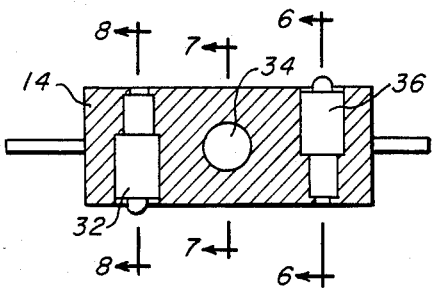
FIG. 5
FIG. 7
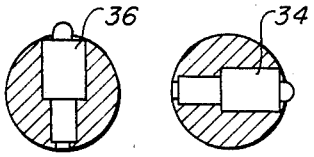
FIG. 6
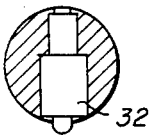
FIG. 8
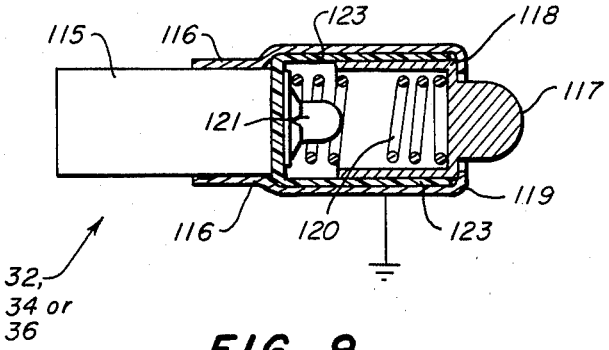
FIG. 9

SAFING AND ARMING DEVICE

CROSS REFERENCE TO RELATED APPLICATION

This is a continuation-in-part of application Ser. No. 216,400 filed Dec. 15, 1980 and now abandoned.

BACKGROUND OF THE INVENTION

This invention relates generally to safing, arming and firing mechanisms and more particularly to such mechanisms that are used to arm and initiate a train of explosives in ordnance fuzes. The fuzes are adapted for use in missiles and are designed to be responsive to forces of acceleration.

It has long recognized that ordnance items such as bombs, missiles, torpedoes, projectiles and the like are often subjected to a certain amount of mishandling, tampering and adverse environmental influences during storage and handling of the ordnance. For this reason, ordnance items have been designed to include safety and arming devices to prevent premature detonation of the ordnance prior to the occurrence of a desired event or condition. The safety and arming devices positively preclude premature detonation of the ordnance before its delivery to the target.

The principal design recognized by experts as an acceptable safe design provides an inert barrier or interrupter which interrupts an explosive train containing primary (sensitive) explosives from the secondary (insensitive) explosives leading to the main charge of the ordnance device. Upon the occurrence of the desired arming event, the inert barrier is physically shifted and a detonator is brought into alignment with the remainder of the explosive train to ready the weapon for firing upon actuation of the firing trigger, impact with the target, or other firing event. Many such safety, arming and firing devices employ a barrier containing a detonator which is turned or translated from the unarmed to the armed position at the desired time, thus aligning the detonator with the remainder of the explosive train.

In the prior art of safing and arming devices for ordnance applications, a plurality of safing and arming devices have been required to obtain a plurality of explosive functions where the explosive functions are required at different times in a weapons system.

The present invention solves this problem and allows a design for a weapon system to use a much more inexpensive and simplistic arrangement by eliminating multiple fuzes or multiple safing and arming devices.

SUMMARY OF THE INVENTION

Accordingly, one object of this invention is to provide a new and improved safing and arming device that affords greater simplicity in the design of ordnance equipment where multiple firing functions are required.

A further object of this invention is to provide an interrupter for a safing, arming and firing device that is fitted with a multiplicity of closely spaced detonators that are positioned to prevent either sympathetic detonation or destruction of the remaining detonators when any one detonator is fired.

A still further object of this invention is to provide a barrier whose integrity is maintained after each of its multiplicity of detonators is fired so that each succeeding detonator maintains its firing alignment with its respective explosive train.

Briefly, in accordance with one embodiment of this invention, these objects are attained by providing a safing and arming mechanism interrupter having multiple electroresponsive detonators contained and located within said interrupter where the interrupter is movable from an unarmed position to an armed position, where each detonator is then simultaneously aligned with the remaining explosive components in its respective explosive train, and where each detonator separately explosively initiates a separate explosive train.

BRIEF DESCRIPTION OF THE DRAWINGS

A more complete appreciation of the invention and many of the attendant advantages thereof will be realized as they become better understood by reference to the following detailed description when considered in connection with the accompanying drawings wherein:

FIG. 4 is a perspective view of the fuze interrupter in armed position with only one explosive train illustrated.

FIG. 5 is a longitudinal cross-sectional view of the interrupter illustrating the position of detonators therein.

FIG. 6 is a cross-sectional view of the interrupter taken along line 6—6 of FIG. 5.

FIG. 7 is another cross-sectional view of the interrupter taken along line 7—7 of FIG. 5.

FIG. 8 is still another cross-sectional view of the interrupter taken along line 8—8 of FIG. 5.

FIG. 9 is an enlarged cross-section view of the detonator with its attached electrical button contact assembly shown in the undepressed position (shorted).

DETAILED DESCRIPTION OF THE PREFERRED EMBODIMENTS

Figure 1:
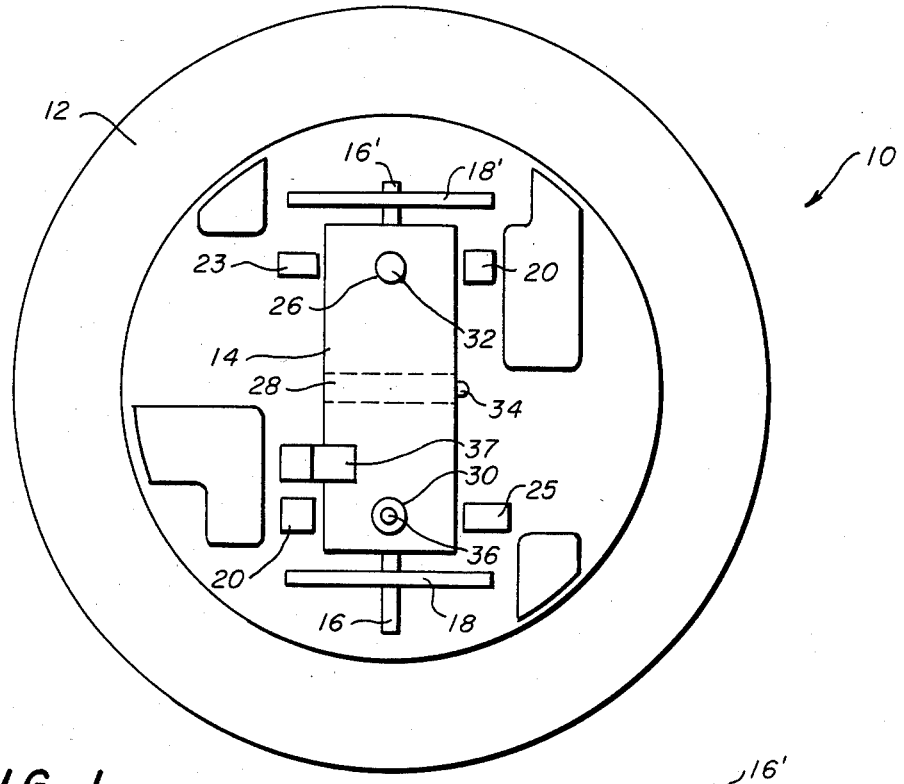
FIG. 1 is a plan view illustrating a housing or base and some parts of a missile fuze.

Referring now to the drawings, FIG. 1 is a view showing pertinent parts of an ordnance fuze, identified generally by numeral 10. The fuze includes a base or housing 12, adapted to be mounted in a missile or projectile, and to support a rotatable cylindrical member identified as interrupter 14. The interrupter has oppositely extending axial shafts 16 and 16' which are mounted in base portions 18 and 18', respectively.

Only parts of the fuze necessary for illustrating the principle of the invention, as defined by the claims, are illustrated in FIG. 1. Further detailed description will be made to other parts and features of the fuze later in this specification.

Figure 2:
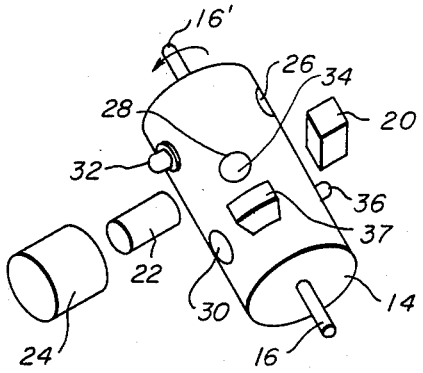
FIG. 2 is a perspective view of the fuze interrupter which houses three detonators and which is adapted to be rotated from safe to armed position.

Referring to FIG. 2, there is illustrated in exploded perspective view interrupter 14, electrically conductive post 20, explosive transfer lead 22, and booster 24. The cylindrical body of interrupter 14 is provided with a plurality of axially spaced apart radially directed transverse openings 26, 28 and 30, each of which is orthogonally positioned with respect to immediate adjacent openings. Detonators 32, 34 and 36 are carried in holes 26, 28 and 30, respectively, and are adapted to be sequentially detonated for firing in the radial direction of their respective opening. Holes 26, 28 and 30 are also illustrated in FIG. 1, as are detonators 32, 34 and 36.

Explosive transfer leads 23 and 25 are illustrated in FIG. 1. Lead 22 is not visible in FIG. 1 because it is beneath cylindrical member 14; however, it is illustrated in FIG. 2. While explosive transfer lead 22 and booster 24 are shown together in FIG. 2 for simplicity, the transfer lead may in practice extend a considerable distance to the booster in some other part of the missile or projectile where the main explosive charge is located. The detonator, explosive lead and booster form an explosive train.

As can be seen in FIGS. 1 and 2, a mass 37 is provided on the periphery of cylindrical member 14 to provide an out of balance condition. Whenever a projectile or missile carrying this fuze is fired, acceleration or other mechanical forces (not disclosed) are applied in a direction normal to the axis of cylindrical member 14 cause the cylindrical member to rotate approximately 90° in the direction of the arrow (FIG. 2) about end shafts 16 and 16' which are mounted respectively in housing or base portions 18 and 18'. This rotation of member 14 causes openings 26, 28 and 30, each carrying a detonator, to be positioned, respectively, in aligned adjacency with explosive transfer leads. The interrupter is now in "armed" position. FIG. 4 illustrates this alignment with respect to a single explosive transfer lead, whereby when the detonator in opening 28 is fired, the shock it produces detonates explosive transfer lead 22, which, in turn, detonates booster 24.

The other detonators are likewise aligned with explosive transfer leads for allowing explosive communication along the train. The detonators are electro-explosive detonators, and details of these detonators and firing features therefore will be described later in the specification, with particular reference to the drawing in FIGS. 9–12. The detonators, when member 14 is in the position illustrated in FIG. 4, may be fired in selected sequence without cross detonation to an adjacent explosive transfer lead not intended to be fired by that detonator, and without damage to, or unintended initiation of, adjacent detonators or malalignment of the cylindrical member for subsequent firings. Not only are the detonators axially spaced apart along member 14 but they are directed at substantial angular spreads. This spread is 90°, but it can be more or less, depending upon the number of detonators involved and the particular design.

Figure 3:
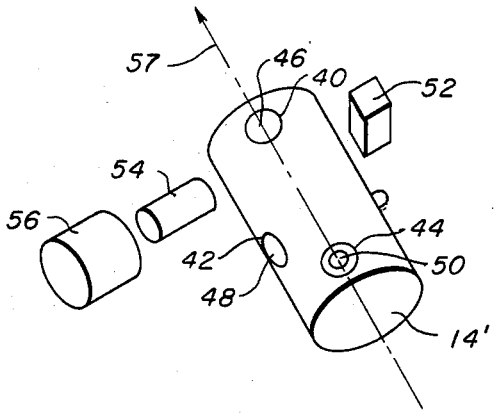
FIG. 3 is a perspective view of the fuze interrupter which is adapted to be moved axially (rather than rotated as in FIG. 2) from safe to armed position.

FIG. 3 is concerned with an alternate arrangement for moving or translating the interrupter. This interrupter, identified by numeral 14', is received in a cylindral opening (not illustrated) in the base or housing and is adapted to slide in an axial direction therein when subjected to axial acceleration, such as exists in the firing or launching of a projectile or rocket. The interrupter is provided with openings 40, 42 and 44 containing, respectively, detonators 46, 48 and 50. Conductive backing member 52, explosive transfer lead 54, and booster 56 are also illustrated in an exploded arrangement similar to that of FIG. 3. The interrupter is illustrated in "safe" position. It will become armed once cylinder 14' has been moved in an axial direction, as indicated by arrow 57, as a result of forces of acceleration in that direction, when detonators are aligned with respective explosive transfer leads.

FIG. 4, to which the numerals of FIG. 2 are applied, illustrate the interrupter in "armed" position wherein detonators are aligned with one explosive lead. For simplicity, only one booster, explosive lead and detonator is illustrated in FIG. 4.

FIG. 5 is a longitudinal cross-sectional view of interrupter 14 illustrating detonators 32, 34 and 36 in orthogonally positioned openings. FIGS. 6, 7 and 8 are transverse cross-sectional views taken along lines 6—6, 7—7, and 8—8 of FIG. 5 for illustrating the positions of the detonators.

The detonators are of a military variety. The type used in this invention is the MK 96 MOD 0 with an auxiliary button contact assembly attached to it. The detonator and contact assembly is illustrated in the enlarged cross section a view of FIG. 9, to which brief description will now be made. Outer metal casing 116 of the contact assembly has an opening in one end for metal button 117. The button has a base 118 including a cylindrical skirt portion extending coaxially within casing 116. Button 117 and base 118 are electrically conductive. Base 118 makes electrical contact with metal casing 116 at end 119 which grounds any electric potential at button 117 directly to casing 116 so as to short circuit to ground the resistance wire (not illustrated) within detonator housing 115 that is used to initiate the detonator. A cup shaped member including a cylindrical sleeve 123, formed of electrically insulating material, is located in casing 116 between conductive casing wall 116 and the skirt of base 118. Housing 115 of detonator 32 contains an explosive charge adapted to be fired when an electric current is passed through a resistance bridgewire within the charge.

The detonators are secured in the openings of interrupter 14 or 14' with buttons 117 extending beyond the outer periphery. Button 117 is urged to the extended position by spring 120, as illustrated in FIG. 9, where electric current entering button 117 is shorted through casing 116 to ground. When the interrupter is moved to "armed" position, buttons 117 contact electrically conductive posts 20 and are depressed to "unshort" the detonators. Firing current when admitted on command to each detonator flows through its respective post 20, button 117, spring 120, and pin 121, which is in circuit with the resistance bridgewire, to initiate the detonatable explosive in end housing 115.

Figure 10:
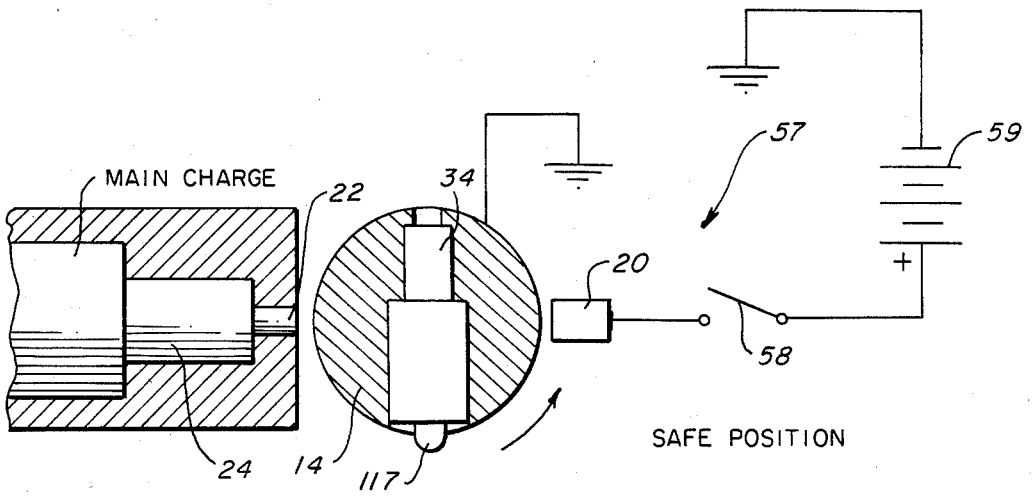
FIG. 10 is an enlarged representation in partial cross-section of the interrupter, one detonator, explosive lead booster and main charge, and electrical firing circuit in "safe" position.
Figure 11:
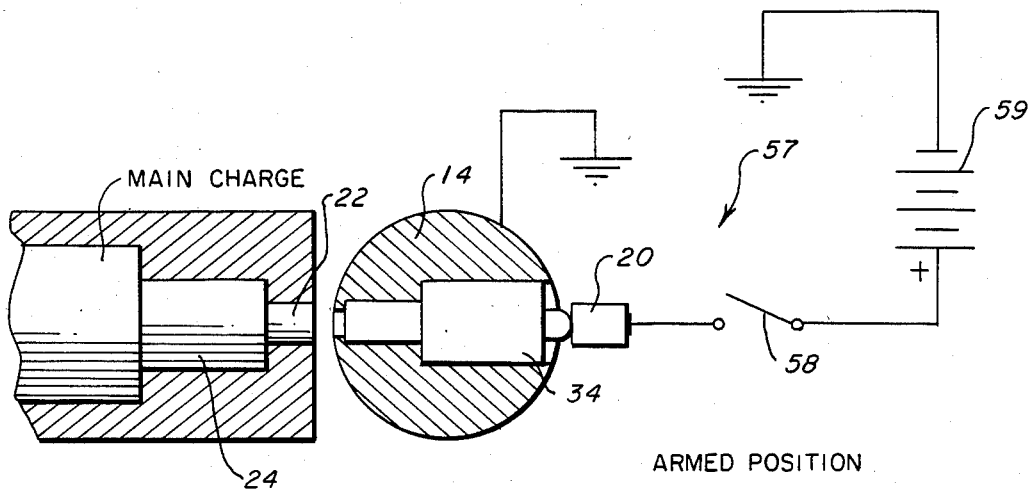
FIG. 11 is similar to FIG. 10, but illustrates the interrupter rotated about 90° to align the detonator, with the remainder of the explosive train to assume "armed" position.

FIGS. 10 and 11 are cross-sectional representations of the interrupter and explosive train. FIG. 10 illustrates interrupter 14 turned so that one of the detonators is pointed up or in a direction away from its explosive transfer lead 22. The fuze is "safe". Electrical circuit 57 is available to fire detonator 34. It is an open circuit because button 117 of detonator 34 is shorted as described and illustrated with respect to FIG. 9. Even if firing circuit were closed by switch 58, detonator 34 would not be fired. Once interrupter 14 has been caused to rotate due to acceleration (mass not illustrated in FIGS. 10 and 11) resulting from launch, detonator 34 is aligned with explosive transfer lead 22, as illustrated in FIG. 11. Button 117 of detonator 34 is now depressed by post 20 to "unshort" the detonator and complete firing circuit 57. When switch 58 is closed, the circuit is completed and detonator 34 is fired to detonate in sequence explosive transfer lead 22, booster 24 and a main charge (not illustrated). The remaining detonators in interrupter 14 have also been aligned with their respective explosive transfer leads and are fired in leading or lagging sequence with detonator 34 as programmed.

An example of operation of the safing and arming mechanism is now given. Interrupter 14 or 14', carrying three MK 96 MOD 0 electric detonators and contact assemblies is held locked by means (not illustrated) until arming is permitted. The locks are removed and the interrupter is allowed to rotate 90° from FIG. 10 to FIG. 11, as illustrated, upon being subjected to acceleration encountered upon launch in a missile or firing in a projectile. In the now "armed" position, the detonator output ends face respective explosive transfer leads and the remainder of the explosive train. In addition, each detonator button 117 has been depressed by contact with electrically conductive posts 20, thus removing the safety short circuit which shunted the detonator's bridgewire. At any future time, energy from any electrical firing energy source, such as battery 59, can be delivered to each detonator by the circuit when switch 58 is closed. Each detonator may be initiated by firing circuit 57, or have its own firing circuit. Thus, each detonator may be fired on command at a time different from the other detonators. By the construction and arrangement disclosed herein, several detonators and explosive trains have been armed simultaneously, but may be fired at different times. Due to the novel arrangement, the firing of any one of the detonators will not cause damage to or displacement of the other detonators. Moreover, the firing of any one of the detonators will not cause sympathetic firing of other detonators or detonate other trains. The use of stainless steel as the material for the interrupter has been found to minimize local deformation in the vicinity of the detonators when fired, thereby preserving the integrity of unfired detonators.

There have been disclosed herein safing and arming devices. It is obvious that deviations and variations can be made thereto without departing from the spirit of the invention which is meant to be limited only by the scope of the claims annexed hereto.

What is claimed is:

1. A safe and arming arrangement for ordnance fuzes contained in a missile comprising:

a housing;

an interrupter including a cylindrical member carried in the housing and adapted for movement therein when subjected to acceleration;

said cylindrical member having a plurality of axially spaced apart radially directed openings;

each opening orthogonally positioned with respect to adjacent openings;

a detonator carried in each opening;

a plurality of explosive transfer leads carried by the housing facing the surface of the cylindrical member;

said detonators and explosive transfer leads normally out of explosive communication;

said cylindrical member upon having forces imparted thereto adapted to move for aligning the detonators therein with respective explosive transfer leads;

whereby the fuze is armed.

2. The invention according to claim 1 wherein the cylindrical body is axially slidably received in the housing and is adapted to have linear movement imparted thereto when subjected to forces.

3. The invention according to claim 1 further defined by the cylindrical member adapted to have axial rotational movement imparted thereto by the forces for aligning the detonators with respective explosive leads.

4. The invention according to claim 3 further defined by the cylindrical body having a shaft about which rotational movement is imparted.

* * * * *